(No Model.) 2 Sheets—Sheet 2.
A. C. EIDELBACH.
SAW SHARPENING MACHINE.
No. 318,363. Patented May 19, 1885.
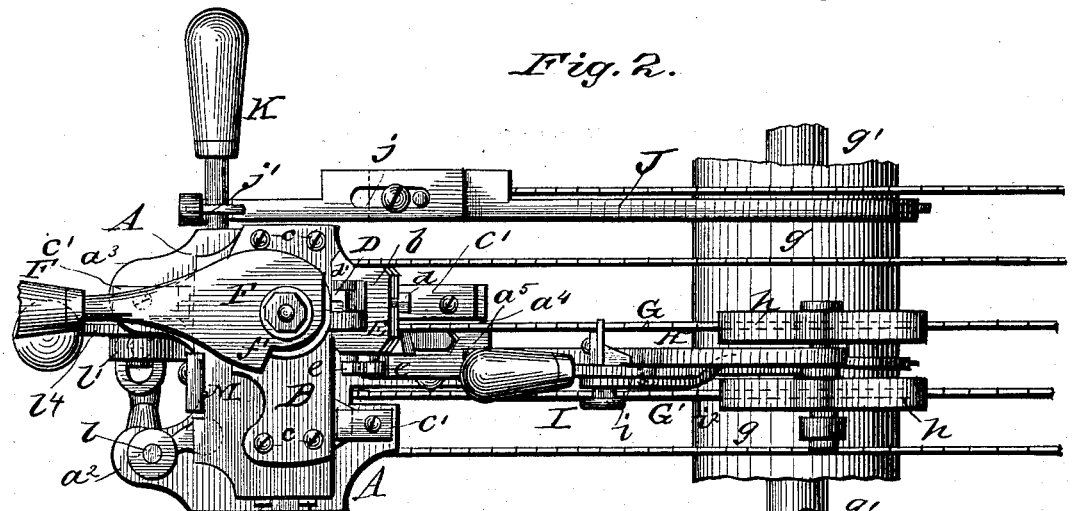
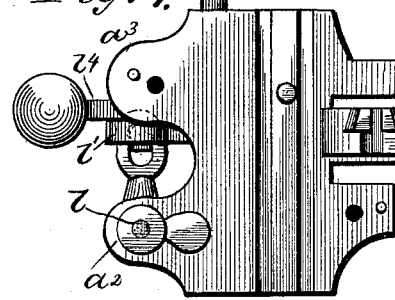
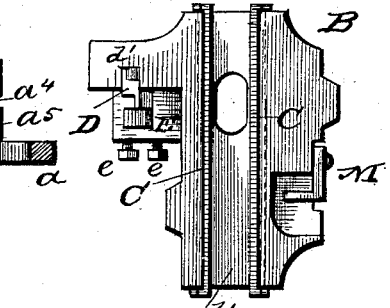
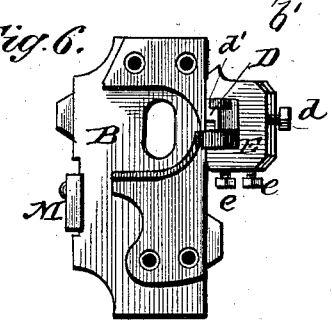
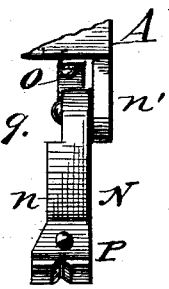
WITNESSES:
Phill Masi
John T. Morrow
INVENTOR
A. C. Eidelbach
BY Anderson Smith
his ATTORNEYS

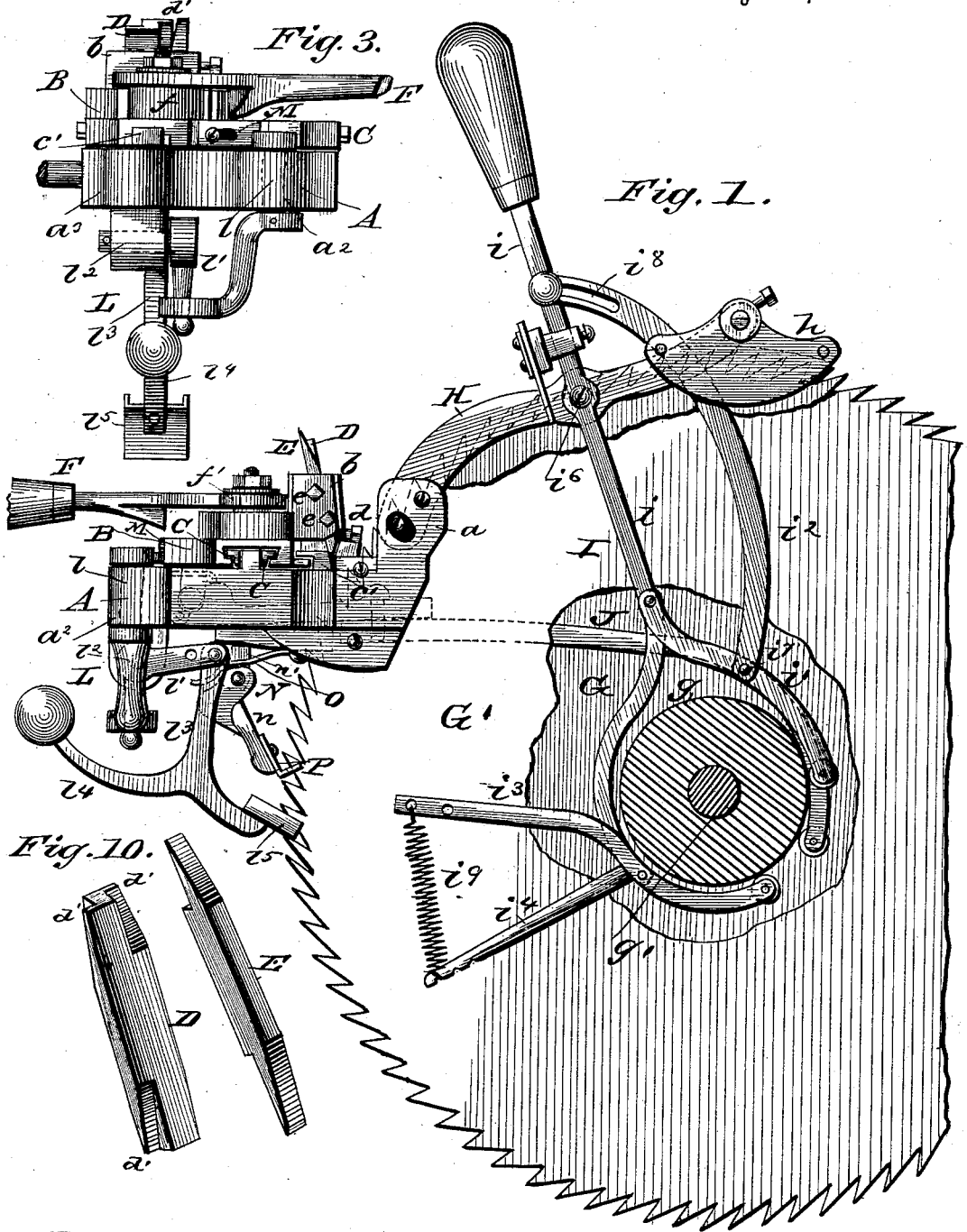

UNITED STATES PATENT OFFICE.

ANDREW C. EIDELBACH, OF FLATONIA, TEXAS.

SAW-SHARPENING MACHINE.

SPECIFICATION forming part of Letters Patent No. 318,363, dated May 19, 1885.

Application filed November 15, 1884. (No model.)

*To all whom it may concern:*

Be it known that I, ANDREW C. EIDELBACH, a citizen of the United States, residing at Flatonia, in the county of Fayette and State of Texas, have invented certain new and useful Improvements in Saw-Sharpeners; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of my device. Fig. 2 is a plan view of the same. Fig. 3 is a front view. Figs. 4, 5, 6, 7, 8, 9, and 10 are detail views.

This invention relates to certain improvements in the art of cutting and sharpening the teeth of circular saws arranged in gangs, and is more particularly applicable to gin-saws.

The objects of the invention are to construct a machine which may be quickly and securely connected to the gang of saws, and may be readily adjusted thereon to cut the teeth or change the already-formed teeth to any required depth; also, to vary the pitch of the cutting and make the adjustment of the cutter-bars and other requisite parts as simple as is possible in a machine of the necessary complexity.

The general construction of the machine and its mode of attachment to the gang of saws are as follows: A bed piece or block, of suitable form, is connected by certain bars, hereinafter described, to the collars or washers fixed on the shaft or mandrel between and separating the saws of the gang. A bar is adjustably attached by one end to the bed-block, and carries at its outer end two guide-pieces pivoted oppositely on the sides of the end, and each provided with a narrow vertical recess to fit over the upper edge of a saw. One of these guide-pieces fits over the saw to be operated on and the other over the saw next adjacent in the gang. By means of these two guide-pieces the saw is directed more truly and firmly than with only one, the adjacent saw giving an additional point of support to hold the saw being operated on in position, and making it less liable to bend or buckle. The guide-pieces direct the saw into a deep narrow groove or recess in the bed-block, where the cutter-bar forms or deepens the teeth upon its edge. The adjustment of the bar holding the guiding-pieces makes the cutter-bar give the teeth the desired pitch. A cutter-block is constructed and arranged to move in ways upon the bed-block transversely to the line of direction of the saw-recess in the latter, and carries a properly-formed bar which has cutting-edges on the sides of its end. The cutter-block and cutting-bar are moved by an eccentric cam actuated by a lever pivoted to the upper part of the bed-block, their movement bringing the cutting-edges of the bar against the edge of the saw in the recess and forming the teeth in the same. A device forms part of the machine by which the teeth, after passing the cutting-bar, are engaged and the saw rotated into position to form or deepen another tooth. The machine has also another device to chamfer or sharpen the points of the formed teeth. Both of these devices are hereinafter described more fully.

In the accompanying drawings, A represents the bed-block; B, the cutter-block, and F the lever actuating the latter.

The bed-block A has rising from its edge an upright, $a$, to which the bar carrying the guide-pieces is connected at its inner end by two screws, the upper screw serving as a pivot, and the lower, which is a set-screw, passing through a slot running across the upright, so as to allow the bar to lie set and held at different positions, as shown. $a^2$ and $a^3$ are horizontal projections from the bed-block on the side opposite the upright $a$, the purpose of which projections is hereinafter explained. The projection $a^3$ has a downwardly-projecting extension below the lower surface of the bed-block, as shown. $a^4$ is a vertical slot or recess in the bed-block running between the upright $a$ and a horizontal projection, $a^5$, for the passage of the saw blade or blank to the cutting-bar.

B is the cutter-block, extending in ways on the upper surface of the bed-block transversely over and across the recess $a^4$, and $b$ is an upright extension therefrom, in a rectangular opening in which the cutter is secured. The said opening inclines downward and forward to bring the edge of the cutting-bar in proper position against the saw. $b'$ is a transverse groove running over a rectangular transverse projection on the upper surface of the bed-block, which latter partly forms the ways upon which the cutter-block travels. The wall of said groove inclines inward toward the projection at its lower edges, and hold strips of brass C C on each side of the projection, the outer sides of which are inclined and fit against the sides of the groove, while their straight inner sides fit against the projections.

$c\ c$ are screws passing through the top of the cutter-block, by means of which the bars C may be driven deeper in the groove, taking up the wear when the ways work loose. The lower ends of the bars are arranged so as not to reach the bottom of the groove. The cutter-block is held upon the bed-block, and its wear taken up thereon by the clips $c'\ c'$, commanded by proper set-screws passing through them and entering the bed-block.

D is the cutting-bar in the inclined opening through the extension $b$, where it is held at the requisite height by a set-screw, $d$. Each end of the cutting-bar has an edge, one on each side, with their inclinations the same, but reversed. These edges $d'\ d'$ are consequently four in number, and the bar may be reversed sidewise or endwise, cutting the same form of tooth in each position. The bar is held in place by proper set screws.

E is a gage-bar passing through the opening in the extension $b$ on one side of the cutting-bar D, and held at a proper position therein by the set-screws $e\ e$. The gage-bar aids in securing the cutting-bar in place, and has each end differently shaped, being reversible end for end. The end that is set below enters between the teeth of a saw, or rests on the edge of a saw-blank, and the cutting-bar is set in a position relative to it, and has the proper edge used to cut the desired form or shape to the space between the teeth. The edges of the cutting-bar are formed to cut the space between the teeth round at its lowest point, so as to prevent the finished saw from clogging.

F is the lever by which the cutter-block is actuated. The said lever has a proper handle at its outer end, and has its inner end pivoted on a vertical rod or shaft which has its lower end fixed to the bed-block. $f$ is a circular eccentric on the lower surface of the lever, which eccentric, turning around the rod, moves in a D-shaped recess in the outer block and makes said block travel from side to side of the bed-block. $f'$ is a stop on the edge of the lever, which strikes against the edge of the cutter-block and prevents the latter traveling too far.

G is the saw being cut, and G' an adjacent saw, the former of which passes through one of the guide-pieces and the recess $a^4$, and the latter through the other guide-piece alone, its edge running outside of the projection $a^5$. $g$ are the collars or washers separating the saws, and $g'$ is the shaft or mandrel upon which the washers and the saws are fixed.

H is the bar, carrying the guide-pieces $h\ h$ at its outer end, and having its inner end adjustably attached to the upright $a$, as heretofore explained. The said bar curves upward in the proper direction from the bed-plate, and the guide-pieces are each composed of two lateral plates having their lower edges curved or rounded downward, the saw passing into the recess between the plates. The guide-pieces are situated on a rod or stem passing transversely through the end of the bar H, and may be adjusted to suit various positions of said bar in relation to the bed-block. The guide-pieces may be set at a greater or less distance apart to suit the distance between the saws of a gang, as is evident from the construction of parts shown in the drawings.

I is the device for keeping the machine attached to the collar on the side of the saw G opposite the saw G'. The said device is composed of the bars $i$, $i'$, $i^2$, $i^3$, and $i^4$. The bar $i$ stands nearly vertical, and has a proper handle at its upper end. It runs thence downward, being pivoted to the bar H at $i^6$, and has its lower part curved toward the machine, so as to pass about half-way around the washer or collar. The bar $i'$ pivots by its upper end to $i$ at the beginning of the bend, and curves over the collar, in the opposite direction to the bar $i$, to about the central horizontal line of the collar, having a roller on its lower end to make it move easily on the same. The bar $i^2$ is pivoted at a proper point, $i^7$, to $i'$, and curves thence upwardly toward the bar $i$, having a slot, $i^8$, in its upper end, by means of which and a proper set-screw it may be fixed at different positions on said bar. The bar $i^3$ is pivoted at a proper point, as shown, on the lower end of the bar $i$, having its upper end passing up on the opposite side to said bar, and provided with a roller to make it work or move easily on the collar. Its lower end extends downward on the side of the machine, as shown. The bar $i^4$ is fixed by its upper end at the junction of the bars $i$ and $i^3$ to the former, and extends thence downward below the latter, to which it is attached by the coiled spring $i^9$, the ends of which are connected with the two bars, the lower end being detachable from the bar $i^4$.

J is a steadying-bar attached to the bed-block on the side upon which is situated the projection $a^5$, running thence between two saws, and having on its outer end a roller which rests upon the collar between the same. The said bar is made in two parts connected by a slot, $j$, and set-screw, so as to be extensible, and has at its inner end a coupling device, $j'$, composed of a pin and rotating link, as shown, which passes over a handle, K. The handle K has its end secured to the side of the bed-block, and by it the operator holds the machine in position.

L is the device by which the saw is fed forward after having a tooth cut or deepened, and its construction is as follows: An arm, $l$, has its upper end vertical and passing through and rotating in an opening in the extension $a^2$, its extreme upper end being retained above said projection by a proper head, and having a horizontal arm fixed to it, which passes into a slot in the cutter-block. The said arm is vibrated, thereby rotating partially or oscillating the arm $l$ by means of a clip, M, which impinges upon its edge. The clip is attached to the cutter-block by a slot and set-screw, so as to move the arm (as the cutter-block moves) more or less, as desired. The arm $l$ has its lower end bent horizontal and slotted. $l'$ is a bell-crank lever provided at its bend with the horizontal shaft $l^2$, which rotates in an opening through the extension $a^3$. One arm of the said lever descends and has its end within the slot in the arm $l$, so as to turn the lever on the shaft $l^2$ as the said arm oscillates or vibrates. The horizontal arm of the bell-crank lever has pivoted at its end an arrangement by which the teeth are engaged and the saw moved. This arrangement consists of the arm $l^3$, pivoted by its upper end to the bell-crank lever, the arm $l^4$ extending outward from the saw and carrying on its end a weight more than counterbalancing the holder, and the arm $l^5$, extending toward the saw and carrying on its end the holder $l^5$, which engages between the teeth and stops or holds the saw in the position to have the succeeding tooth cut. The holder may be made to jump one or more teeth by the adjustment of the clip M on the cutter-block.

N is a device to chamfer or sharpen the teeth on their back edges at the point. It consists of an arm, $n$, pivoted to a clip, $n'$, secured to the lower surface of the bed-block. The said arm is driven upward by the spring O, secured to the bed-block, and carries at its lower end a cutting-bit, P, having a recess or slot through which a tooth may pass, the cutting-edges of said slot (which is V-shaped) beveling and sharpening the points of the teeth on their back edges as they pass through.

The connecting device I also serves to bring the machine upward and make the cutting-bars pass in between the teeth or in their throats when a tooth escapes from the forwarding device L. This action is effected by the pull of the coiled spring $i^5$, the machine being held in place by the action of the bars $i$, $i^3$, and $i^4$ and the steadying-bar J, which together clasp the shaft by means of the collars thereon.

When it is desired to clean the surfaces of two adjacent saws, the machine is detached from the device I, the spring released from the bar $i^4$, the roller on the bar $i'$ is brought on the collar between the saws and fixed there by means of the slotted bar $i^2$ and its set-screws, the rotation of the saws is stopped, a proper scraper or scrapers are attached to the device, and it is rotated by means of the handle between the saw, cleaning the same.

The combined action of the gage-bar fitting between and against the teeth and the steadying-bar serves to keep the teeth from bending or buckling as they pass through the recess $a^4$.

Having thus described my invention, what I claim as new, and desire to secure by Letters Patent, is—

1. The combination of the bed-block A and connecting device I with the cutter-block B, cutting bar or tool D, gage-bar E, strips C C, and lever F, substantially as specified.

2. The combination of the bed-block A and forwarding device L with the connecting device I and steadying-bar J, substantially as specified.

3. The combination of the bed-block A, cutter-block B, and tool D with the forwarding device L, connecting device I, and steadying-bar J, substantially as specified.

4. The combination of the bed-block A, cutter-block B, tool D, gage-bar E, lever F, and connecting device I with the forwarding device L and chamfering device N, substantially as specified.

In testimony whereof I affix my signature in presence of two witnesses.

ANDREW C. EIDELBACH.

Witnesses:
W. S. WALKER,
FRANK MILLER.